(12) United States Patent
Toeda et al.

(10) Patent No.: US 12,396,041 B2
(45) Date of Patent: Aug. 19, 2025

(54) NETWORK NODE, SYSTEM, AND METHOD FOR INTERFACE ESTABLISHMENT MANAGEMENT

(71) Applicant: NTT DOCOMO, INC., Tokyo (JP)

(72) Inventors: Teruaki Toeda, Tokyo (JP); Kenji Kai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 380 days.

(21) Appl. No.: 17/429,869

(22) PCT Filed: Feb. 14, 2019

(86) PCT No.: PCT/JP2019/005432
§ 371 (c)(1),
(2) Date: Aug. 10, 2021

(87) PCT Pub. No.: WO2020/166028
PCT Pub. Date: Aug. 20, 2020

(65) Prior Publication Data
US 2022/0110171 A1    Apr. 7, 2022

(51) Int. Cl.
*H04W 76/10* (2018.01)
*H04W 88/08* (2009.01)
*H04W 92/12* (2009.01)

(52) U.S. Cl.
CPC ............ *H04W 76/10* (2018.02); *H04W 92/12* (2013.01)

(58) Field of Classification Search
CPC ..... H04W 76/10; H04W 92/12; H04W 76/11; H04W 76/12; H04W 76/14; H04W 76/15; H04W 76/18; H04W 76/19; H04W 76/23; H04W 76/24; H04W 76/25; H04W 76/27; H04W 92/20; H04W 92/22; H04W 92/24; H04W 88/085
See application file for complete search history.

(56) References Cited

U.S. PATENT DOCUMENTS

| | | | | |
|---|---|---|---|---|
| 6,353,620 | B1 * | 3/2002 | Sallberg ................ | H04W 28/16 370/465 |
| 6,826,406 | B1 * | 11/2004 | Vialen .................. | H04W 28/18 455/452.2 |
| 10,631,358 | B1 * | 4/2020 | Fang ..................... | H04W 76/27 |
| 2003/0050076 | A1 * | 3/2003 | Watanabe ............. | H04W 60/04 455/456.1 |

(Continued)

FOREIGN PATENT DOCUMENTS

WO    2018/030529 A1    2/2018

OTHER PUBLICATIONS

International Search Report issued in PCT/JP2019/005432 on Mar. 26, 2019 (5 pages).

(Continued)

*Primary Examiner* — Jenee Holland
(74) *Attorney, Agent, or Firm* — Osha Bergman Watanabe & Burton LLP

(57) ABSTRACT

A network node includes a receiving unit that receives information related to a protocol version of a message of a higher layer and a control unit that uses a same protocol version for a plurality of higher network nodes that terminate and split the higher layer, based on the information related to the protocol version, in which the network node is one of the plurality of higher network nodes.

4 Claims, 17 Drawing Sheets

(56) References Cited

U.S. PATENT DOCUMENTS

| | | | | |
|---|---|---|---|---|
| 2012/0076076 | A1* | 3/2012 | Kim | H04W 76/10 |
| | | | | 370/328 |
| 2012/0088495 | A1* | 4/2012 | Tsai | H04W 76/18 |
| | | | | 455/422.1 |
| 2012/0272228 | A1* | 10/2012 | Marndi | G06F 8/65 |
| | | | | 717/170 |
| 2014/0056287 | A1* | 2/2014 | Chen | H04B 7/2603 |
| | | | | 370/336 |
| 2014/0187224 | A1* | 7/2014 | Liu | H04L 69/24 |
| | | | | 455/418 |
| 2015/0055585 | A1* | 2/2015 | Huang | H04L 69/08 |
| | | | | 370/329 |
| 2015/0117183 | A1* | 4/2015 | Heo | H04W 4/02 |
| | | | | 370/242 |
| 2015/0327160 | A1* | 11/2015 | Yang | H04W 36/005 |
| | | | | 370/254 |
| 2018/0035484 | A1* | 2/2018 | Kim | H04W 76/19 |
| 2018/0249375 | A1* | 8/2018 | Goldhamer | H04L 1/1812 |
| 2018/0279342 | A1* | 9/2018 | Takiguchi | H04W 72/1273 |
| 2018/0324663 | A1* | 11/2018 | Park | H04W 36/0069 |
| 2019/0174391 | A1 | 6/2019 | Ode et al. | |
| 2019/0268820 | A1* | 8/2019 | Yang | H04W 76/27 |
| 2020/0022109 | A1* | 1/2020 | Wang | H04W 76/27 |
| 2020/0178343 | A1* | 6/2020 | Kim | H04W 76/27 |
| 2020/0236648 | A1* | 7/2020 | Park | H04W 92/045 |
| 2021/0037601 | A1* | 2/2021 | Xu | H04B 7/026 |
| 2021/0059002 | A1* | 2/2021 | Fiorani | H04L 69/24 |
| 2021/0243797 | A1* | 8/2021 | Reddy | H04W 36/0033 |
| 2021/0368574 | A1* | 11/2021 | Jonsson | H04W 76/20 |
| 2022/0022095 | A1* | 1/2022 | Jonsson | H04W 76/10 |
| 2022/0078868 | A1* | 3/2022 | Toeda | H04W 76/15 |
| 2022/0110171 | A1* | 4/2022 | Toeda | H04W 76/10 |
| 2022/0124557 | A1* | 4/2022 | Toeda | H04W 28/082 |
| 2022/0140861 | A1* | 5/2022 | Liu | H04W 28/082 |
| | | | | 370/228 |

OTHER PUBLICATIONS

Written Opinion of the International Searching Authority issued in PCT/JP2019/005432 on Mar. 26, 2019 (6 pages).

CATT; "Discussion on RRC version in DC"; 3GPP TSG-RAN WG3 #102, R3-186561; Spokane, USA; Oct. 12-16, 2018 (44 pages).

3GPP TS 38.300 V15.4.0 "3rd Generation Partnership Project; Technical Specification Group Radio Access Network; NR; NR and NG-RAN Overall Description; Stage 2 (Release 15)" Dec. 2018 (97 pages).

3GPP TS 37.340 V15.4.0; "3rd Generation Partnership Project; Technical Specification Group Radio Access Network; Evolved Universal Terrestrial Radio Access (E-UTRA) and NR; Multi-connectivity; Stage 2 (Release 15)"; Dec. 2018 (67 pages).

3GPP TS 38.401 V15.4.0; "3rd Generation Partnership Project; Technical Specification Group Radio Access Network; NG-RAN; Architecture description (Release 15)"; Dec. 2018 (40 pages).

* cited by examiner

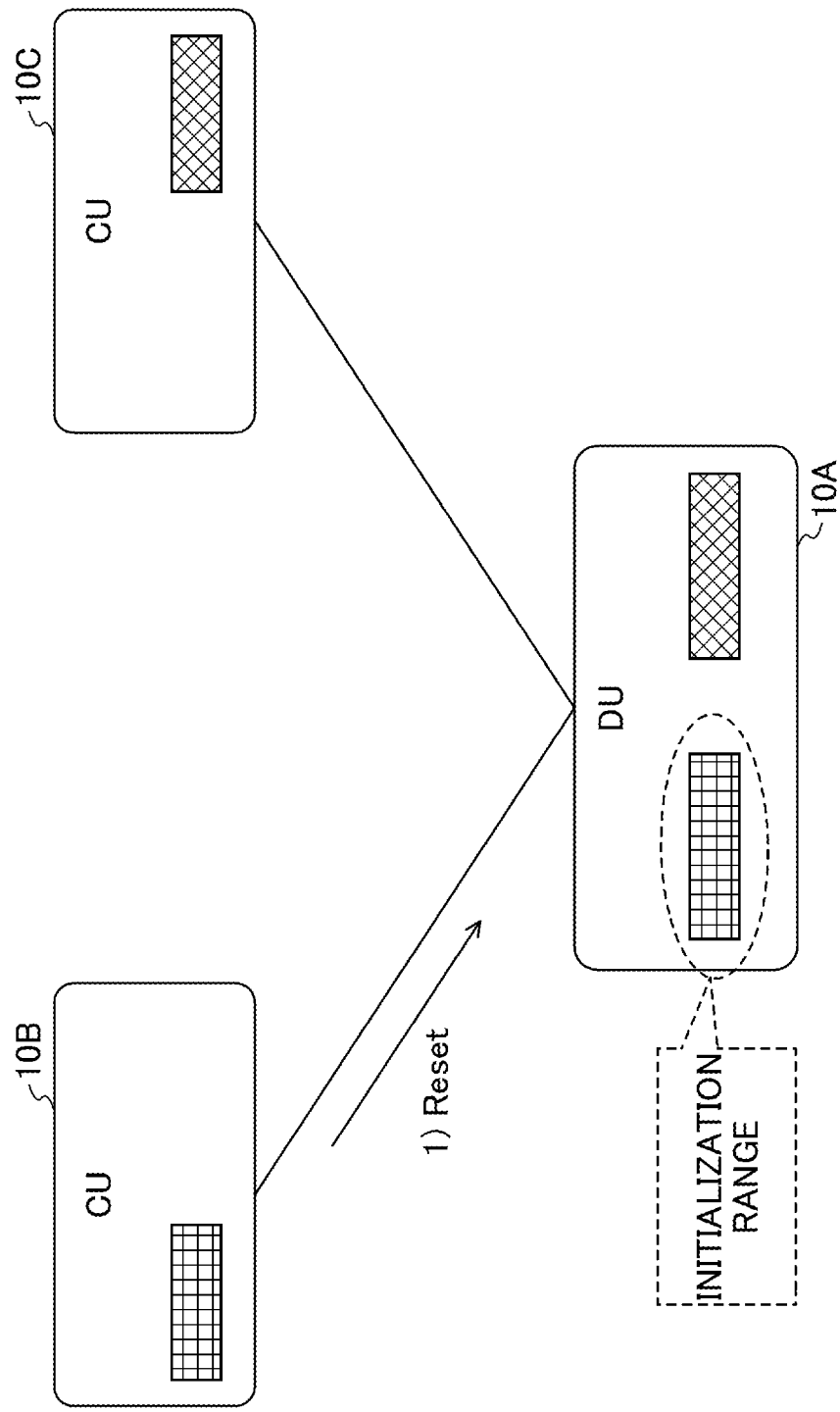

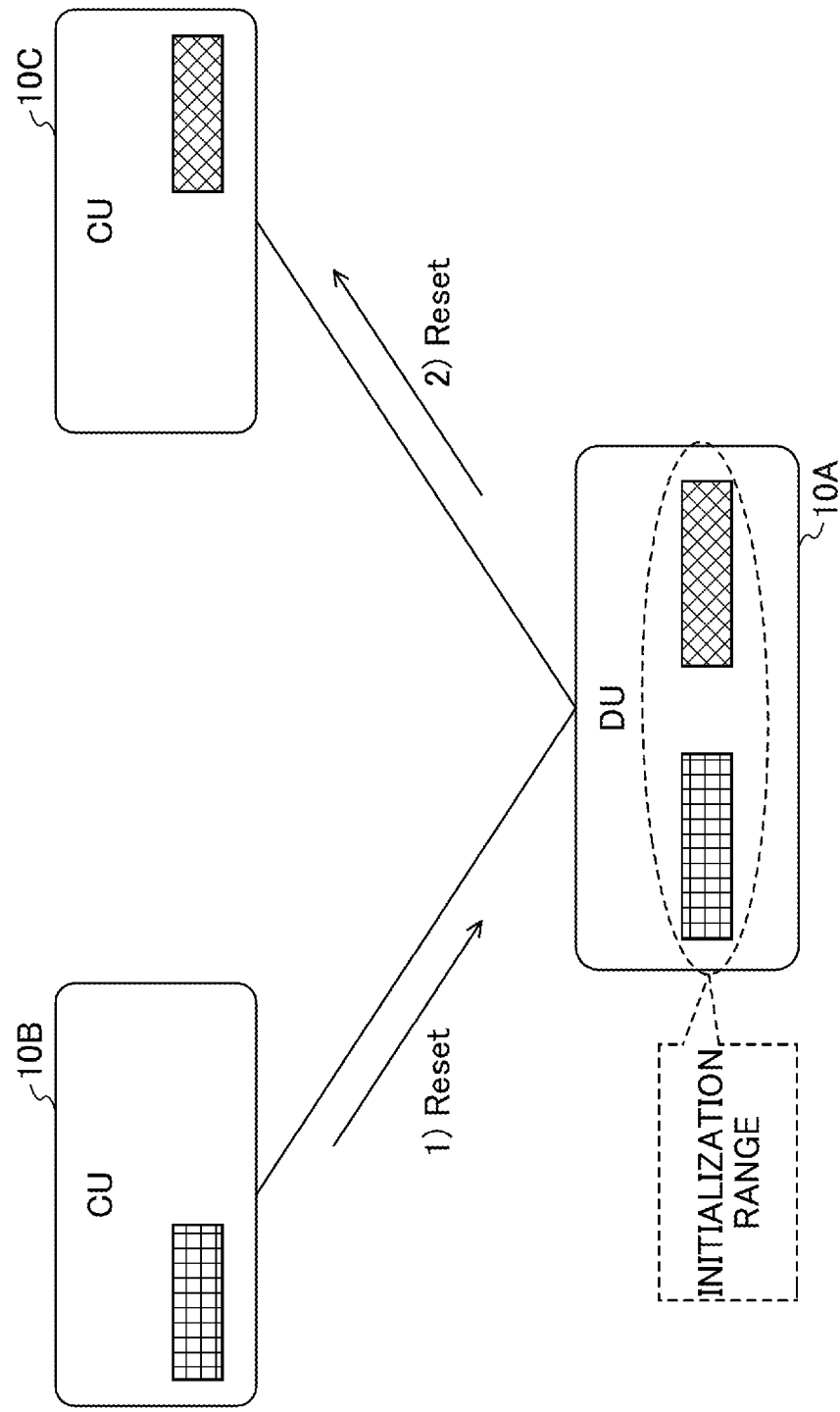

NETWORK NODE, SYSTEM, AND METHOD FOR INTERFACE ESTABLISHMENT MANAGEMENT

TECHNICAL FIELD

The present invention relates to a network node in a wireless communication system.

BACKGROUND ART

In New Radio (NR) (also referred to as "5G") which is a successor system of Long Term Evolution (LTE), a technology satisfying, as required conditions, a large-capacity system, a high-speed data transmission rate, a low delay, simultaneous connection of multiple terminals, a low cost, power saving, and the like is under review (for example, Non-Patent Document 1).

In an NR wireless communication system, similarly to dual connectivity in an LTE wireless communication system, a technique called LTE-NR dual connectivity, NR-NR dual connectivity, or Multi Radio Access Technology (Multi RAT) dual connectivity (hereinafter, "MR-DC") of dividing data between a base station (eNB) of the LTE wireless communication system and a base station (gNB) of the NR wireless communication system and simultaneously transmitting and receiving data through the base stations has been introduced (for example, Non-Patent Document 2).

In the NR wireless communication system, higher layer split (HLS) has been introduced. A higher layer is split and arranged in a gNB-CU (central unit), and a lower layer is split and arranged in a gNB-DU (distributed unit) (for example, Non-Patent Document 3). Further, even in the LTE wireless communication system, it is possible to have a configuration substantially the same CU-DU configuration (the HLS has been introduced).

CITATION LIST

Non-Patent Document

Non-Patent Document 1: 3GPP TS 38.300 V15.4.0 (2018 December)
Non-Patent Document 2: 3GPP TS 37.340 V15.4.0 (2018 December)
Non-Patent Document 3: 3GPP TS 38.401 V15.4.0 (2018 December)

SUMMARY OF THE INVENTION

Problem to be Solved by the Invention

In the wireless communication systems of NR and LTE, connecting a plurality of HLS interfaces to a single DU is under review. In a case in which a single DU includes a plurality of HLS interfaces, there may be inconsistencies in a protocol version between a CU and a DU.

The present invention was made in light of the foregoing, and it is an object of the present invention to use a protocol version that is matched across network nodes in a wireless communication system.

Means for Solving Problem

According to the disclosed technique, a network node including a receiving unit that receives information related to a protocol version of a message of a higher layer and a control unit that uses a same protocol version for a plurality of higher network nodes that terminate and split the higher layer, based on the information related to the protocol version, in which the network node is one of the plurality of higher network nodes is provided.

Effect of the Invention

According to the disclosed technology, it is possible to use a protocol version that is matched between network nodes in a wireless communication system.

BRIEF DESCRIPTION OF DRAWINGS

FIG. 11 is a diagram for describing an example (1) of initialization in an embodiment of the present invention;

FIG. 12 is a diagram for describing an example (2) of initialization in an embodiment of the present invention;

MODE(S) FOR CARRYING OUT THE INVENTION

Hereafter, exemplary embodiments of the present invention will be described with reference to the appended drawings. Embodiments to be described below are an example, and embodiments to which the present invention is applied are not limited to the following embodiments.

The existing technology is appropriately used for an operation of a wireless communication system of an embodiment of the present invention. Here, the existing technology is, for example, the existing LTE but is not limited to the existing LTE. The term "LTE" used in this specification has a broad meaning including LTE-Advanced and schemes after LTE-Advanced (for example, NR) unless otherwise specified.

Also, in an embodiment of the present invention to be described below, terms such as a synchronization signal (SS), a primary SS (PSS), a secondary SS (SSS), a physical broadcast channel (PBCH), a physical random access channel (PRACH) used in the existing LTE are used. This is for convenience of description, and signals, functions, or the like similar to them may be indicated by other names. The above terms in NR correspond to NR-SS, NR-PSS, NR-SSS, NR-PBCH, NR-PRACH, and the like. However, even a signal used for NR is not always indicated by "NR-."

Also, in an embodiment of the present invention, a duplex scheme may be a Time Division Duplex (TDD) scheme, may be a Frequency Division Duplex (FDD) scheme, or may be other schemes (for example, Flexible Duplex or the like).

Further, in an embodiment of the present invention, when a radio parameter or the like is "configured," it may mean that a predetermined value is pre-configured or may mean that a radio parameter indicated from a base station device 10 or a user equipment 20 may be configured.

Figure 1:
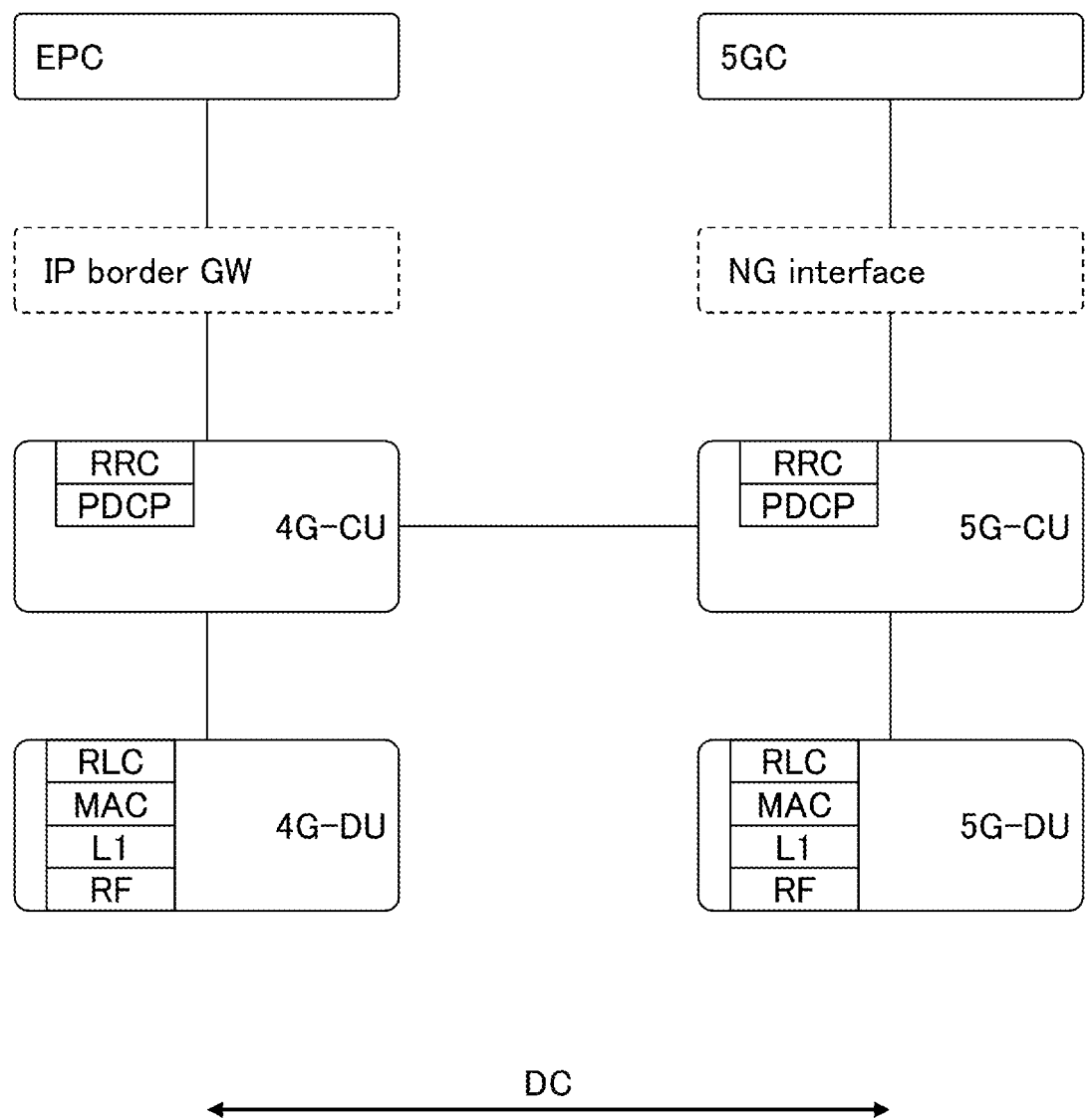
FIG. 1 is a diagram illustrating a configuration example of a network architecture in an embodiment of the present invention.

FIG. 1 is a diagram illustrating a configuration example of a network architecture in an embodiment of the present invention. As illustrated in FIG. 1, a radio network architecture in an embodiment of the present invention includes a 4G-CU (central unit), a 4G-DU (a distributed unit), an evolved packet core (EPC), and the like on an LTE-Advanced side. A radio network architecture in an embodiment of the present invention includes a 5G-CU, a 5G-DU, a 5G Core network (5GC), and the like on the 5G side.

As illustrated in FIG. 1, on the 4G side, the 4G-CU includes a radio resource control (RRC) layer and a packet data convergence protocol (PDCP) layer. The 4G-DU includes a Radio Link Control (RLC) layer, a Medium Access Control (MAC) layer, and an L1 (a layer 1, a PHY layer, or a physical layer) and is connected with a UE via an RF. The network node including the 4G-CU and the 4G-DU is referred to as an eNB. The 4G-CU is connected to the 4G-DU via a fronthaul (FH) interface. The 4G-CU is connected to an EPC via an IP border gateway.

On the other hand, on the 5G side, as illustrated in FIG. 1, the 5G-CU includes an RRC layer and a PDCP layer. The 4G-DU includes an RLC layer, a MAC layer, and an L1, and is connected to a UE via an RF. The 5G-CU includes an RRC layer and is connected to the 5G-DU via the FH interface and connected to the 5GC via an NG interface. The 5G-CU is connected with the 4G-CU via an X2 interface. The PDCP layer in the 4G-CU is a converging or splitting point in a case in which 4G-5G dual connectivity (DC), that is, E-UTRA-NR dual connectivity (EN-DC). The network node including the 5G-CU and the 5G-DU is referred to as a gNB. Also, the 5G-CU is also referred to as a gNB-CU, and the 5G-DU is also referred to as a gNB-DU. In the following description, the base station device 10 may be a gNB-CU that is a network node or a gNB-DU that is a network node. The gNB-CU and the gNB-DU based on 5G are also referred to as an eNB-CU and an eNB-DU, respectively, in the LTE wireless communication system.

Further, as illustrated in FIG. 1, the DC is performed by the 4G-DU and the 5G-DU. Although not illustrated, a user equipment (UE) is wirelessly connected via the RF of the 4G-DU or the 5G-DU and transmits and receives packets.

FIG. 1 illustrates a wireless network architecture at the time of LTE-NR DC, or E-UTRA-NR dual connectivity (EN-DC). However, a similar wireless network architecture may be used when NR is operated in a stand-alone manner.

A plurality of 5G-DUs may be connected to the 5G-CU. Also, NR-NR dual connectivity (NR-DC) may be performed when the UE is connected to a plurality of 5G-CUs, and the NR-DC may be performed when the UE is connected to a plurality of 5G-DUs and a single 5G-CU.

A plurality of 5G-CUs may be connected to the 5G-DU. In the following description, a configuration in which a plurality of 5G-CUs are connected to the 5G-DU is mainly assumed. The following description may be applied to the CU-DU configuration in the LTE wireless communication system.

Figure 2:
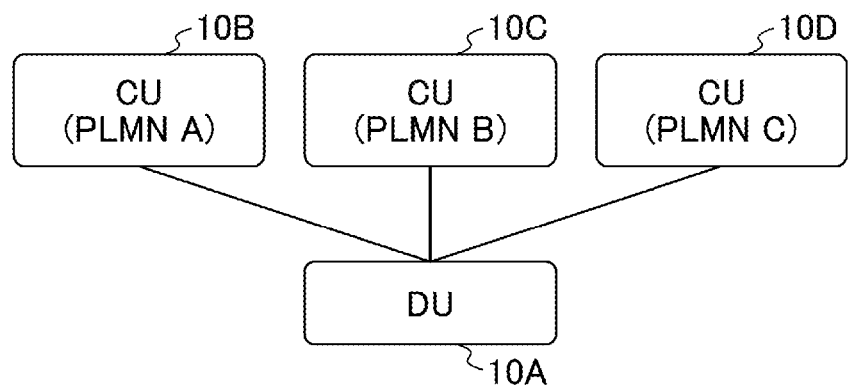
FIG. 2 is a diagram illustrating a configuration example (1) of a wireless communication system in an embodiment of the present invention.

FIG. 2 illustrates a configuration example (1) of a wireless communication system in an embodiment of the present invention. As illustrated in FIG. 2, a CU 10B, a CU 10C, and a CU 10D are arranged for each public land mobile network (PLMN) as radio access network (RAN) sharing, and are connected to a single DU 10A. That is, the DU 10A includes a plurality of HLS interfaces. For example, the HLS interface is an interface from which the PDCP layer or the RRC layer is split.

Figure 3:
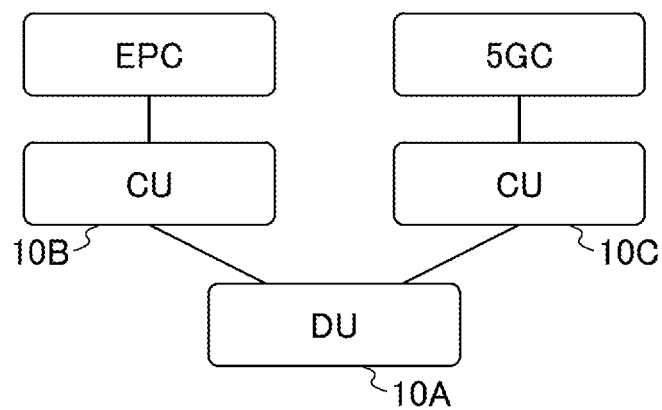
FIG. 3 is a diagram illustrating a configuration example (2) of a wireless communication system in an embodiment of the present invention.

FIG. 3 is a diagram illustrating a configuration example (2) of a wireless communication system in an embodiment of the present invention. As illustrated in FIG. 3, the HLS interface is split in the E-UTRAN and the NG-RAN, and the CU 10B connected to the EPC and the CU 10C connected to the 5GC are connected to the DU 10A. That is, the DU 10A includes a plurality of HLS interfaces. In the example illustrated in FIG. 3, the CU is split for each HLS interface, but a case is assumed in which there is a single CU, and only the HLS interface is splitted.

Here, signals in a wireless communication system are broadly classified into UE-specific signals and cell-common signals. The UE-specific signals are terminated at any one CU. Therefore, for example, a mechanism for allocating the UE-specific signal to the CU for each PLMN ID or for each access network of the E-UTRAN or the NG-RAN is necessary. In a case in which this mechanism does not exist, an appropriate CU is unable to be selected in transmission/reception of the UE-specific signal. On the other hand, in the case of the cell-common signal, a mechanism for preventing inconsistencies between the HLS interfaces in indications from a plurality of CUs is necessary. In a case in which this mechanism does not exist, the DU is unable to determine from which CU an instruction is to be followed.

Figure 4:
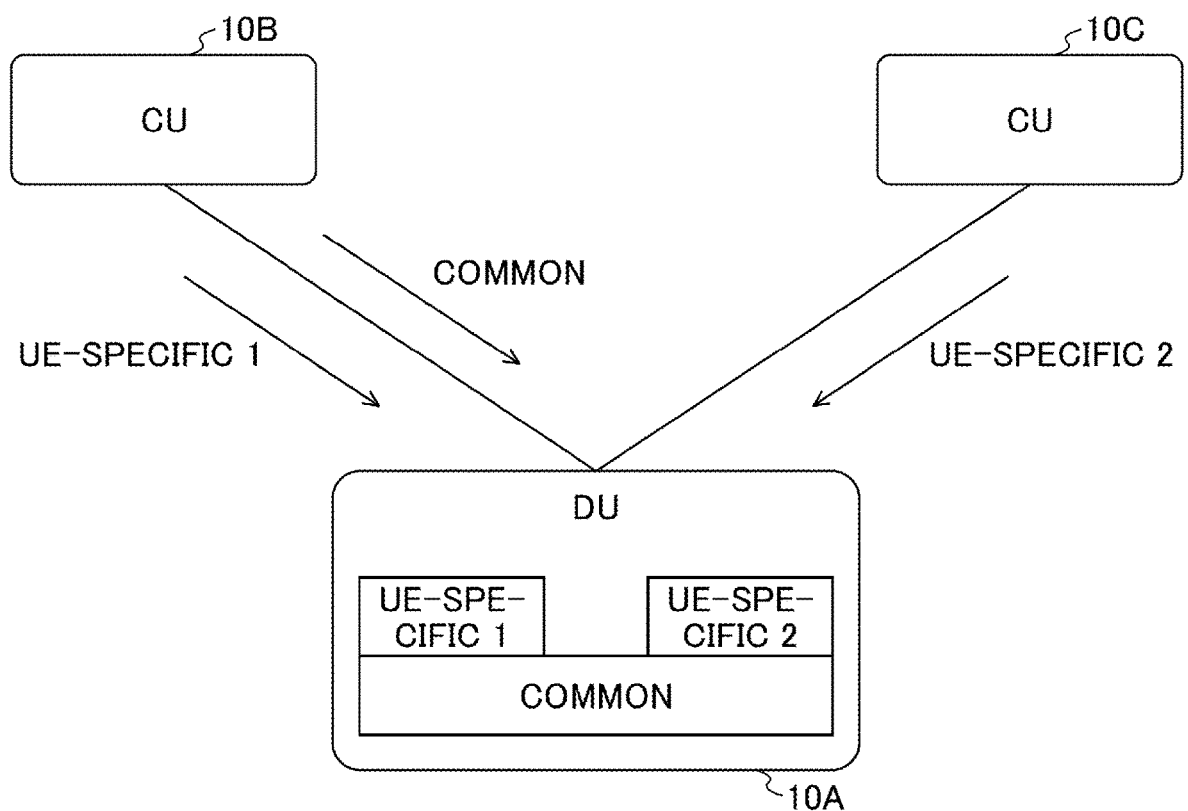
FIG. 4 is a diagram for describing an example (1) of signal transmission in an embodiment of the present invention.

FIG. 4 is a diagram for describing an example (1) of signal transmission in an embodiment of the present invention. FIG. 4 illustrates an example of signals transmitted when the DU 10A is connected to the CU 10B and the CU 10C. As illustrated in FIG. 4, as the UE-specific signals, a UE-specific-1 signal is transmitted from the CU 10B to the DU 10A, and a UE-specific-2 signal is transmitted from the CU 10C to the DU 10A. That is, the UE-specific signal is transmitted from each CU 10.

On the other hand, as illustrated in FIG. 4, the cell-common signal is transmitted by only the CU 10B to the DU 10A. With the configuration in which the cell-common signal is transmitted from a specific CU 10 in advance, the DU 10A can correctly transmit the cell-common signal to the UE 20.

Figure 5:
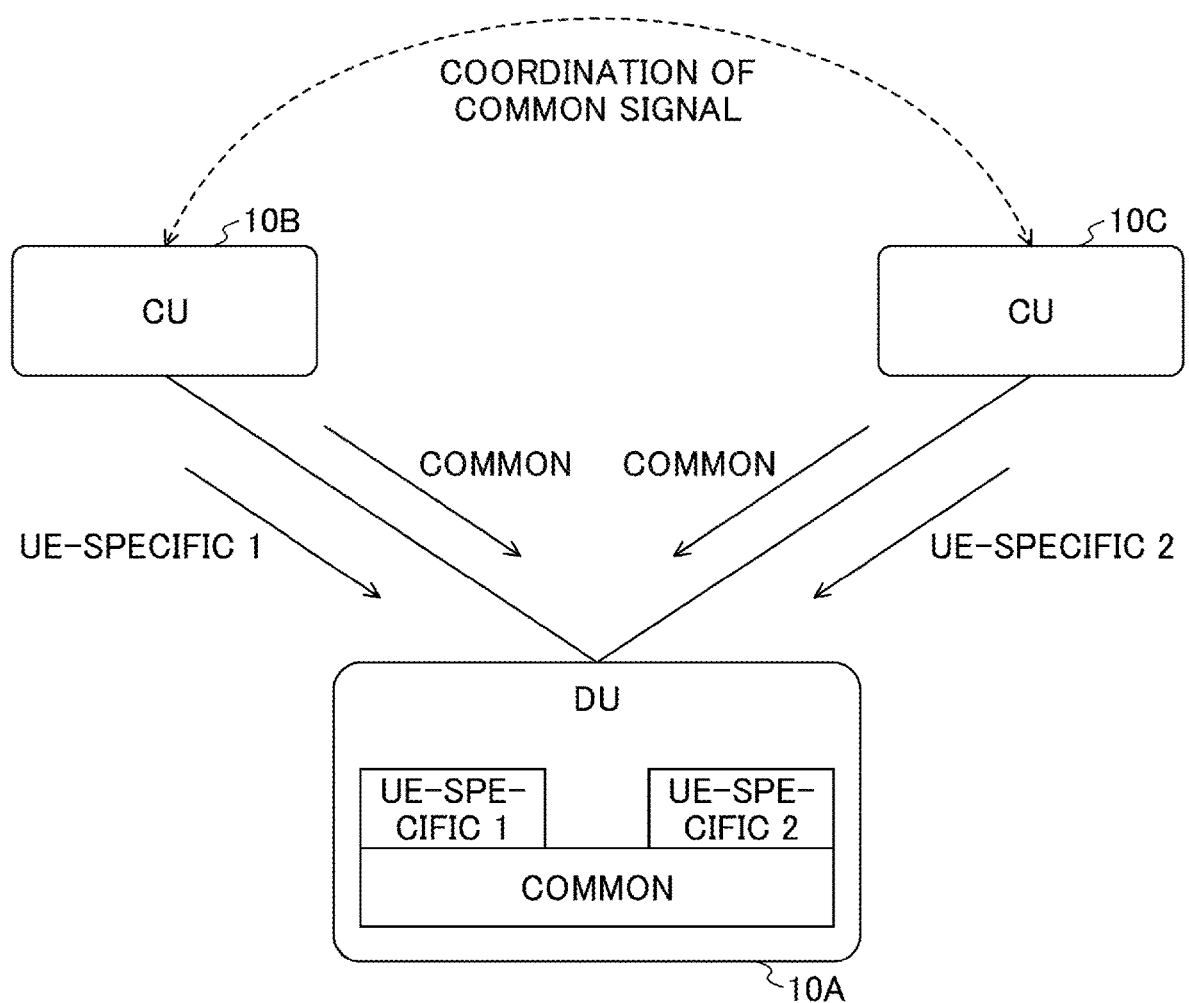
FIG. 5 is a diagram for describing an example (2) of signal transmission in an embodiment of the present invention.

FIG. 5 is a diagram for describing an example (2) of signal transmission in an embodiment of the present invention. FIG. 5 illustrates an example of signals transmitted when the DU 10A is connected to the CU 10B and the CU 10C. As in FIG. 4, as the UE-specific signal, the UE-specific-1 signal is transmitted from the CU 10B to the DU 10A, and the UE-specific-2 signal is transmitted from the CU 10C to the DU 10A. That is, the UE-specific signal is transmitted from each CU 10.

On the other hand, as illustrated in FIG. 5, the cell-common signal is transmitted from the CU 10B or the CU 10C to the DU 10A after cell-common signal coordination is performed between the CU 10B and the CU 10C. With the configuration in which the cell-common signal is transmitted from any one CU 10 after coordination is performed between the CUs 10, the DU 10A can correctly transmit the cell-common signal to the UE 20.

Figure 6:
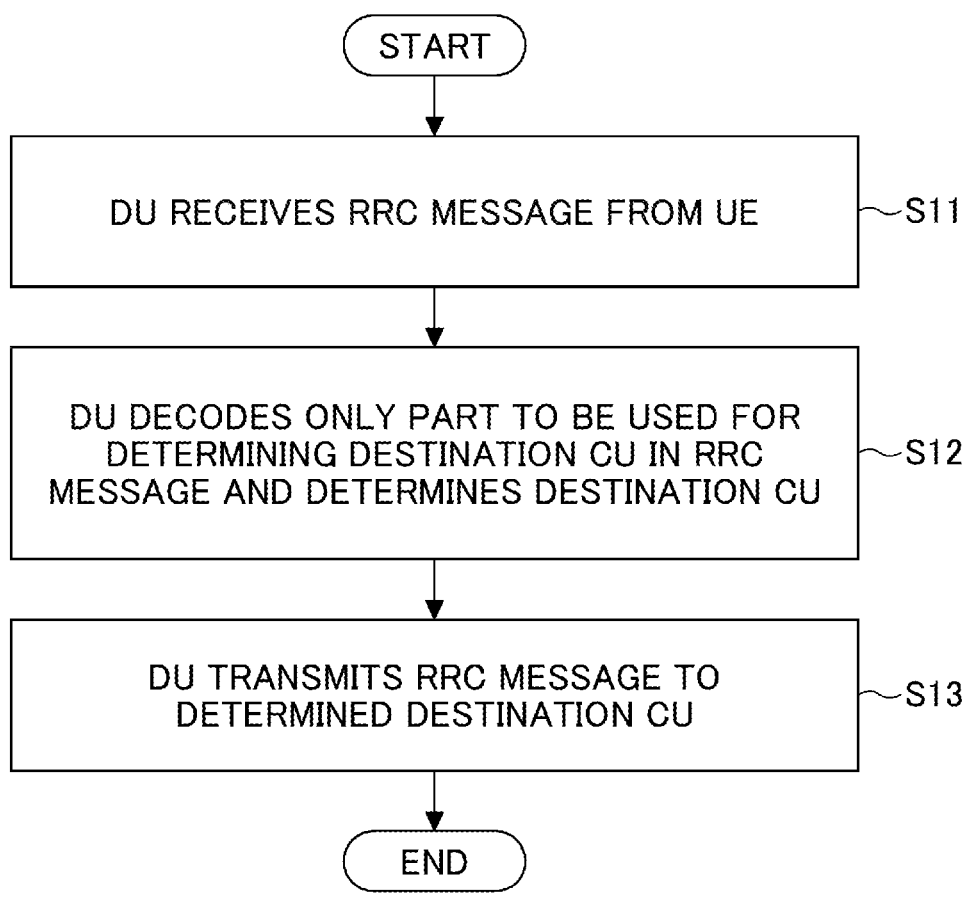
FIG. 6 is a flowchart for describing an operation example (1) in an embodiment of the present invention.

FIG. 6 is a flowchart for describing an operation example (1) in an embodiment of the present invention. An operation example in which the DU 10 that has received the RRC message from the UE 20 determines the CU 10 to which the RRC message is to be transmitted will be described with reference to FIG. 6.

In step S11, the DU 10 receives the RRC message from the UE 20. Since the RRC layer is not terminated at the DU 10, the DU 10 typically does not decode the RRC messages. Therefore, the DU 10 decodes only a part to be used for determining a destination CU 10 in the RRC message and determines the destination CU 10 (S12). Then, the DU 10 transmits an RRC message to the determined destination CU 10 (S13). As described above, the DU 10 that has received the RRC message from the UE 20 can determine the CU 10 to which the RRC message is to be transmitted.

Figure 7:
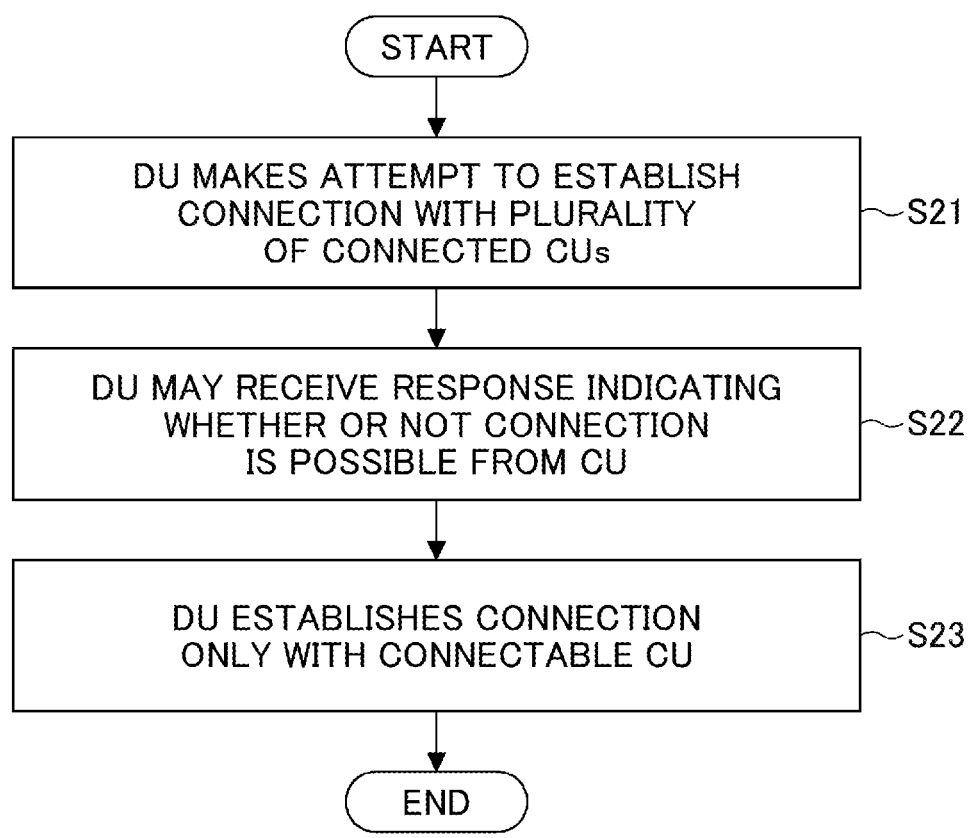
FIG. 7 is a flowchart for describing an operation example (2) in an embodiment of the present invention.

FIG. 7 is a flowchart for describing an operation example (2) in an embodiment of the present invention. An operation example in which the DU 10 that has received the RRC message from the UE 20 determines the CU 10 to which the RRC message is to be transmitted will be described with reference to FIG. 7.

In step S21, the DU 10 makes an attempt to establish connection with a plurality of connected CUs 10. The DU 10 may receive a response indicating whether or not a connection is possible from the CU 10 (S22) or may receive a response only from the CU 10 that is connectable. In step S23, the DU 10 establishes connection only with the connectable CU 10. As described above, the DU 10 that has received the RRC message from the UE 20 can determine the CU 10 to which the RRC message is to be transmitted.

Figure 8:
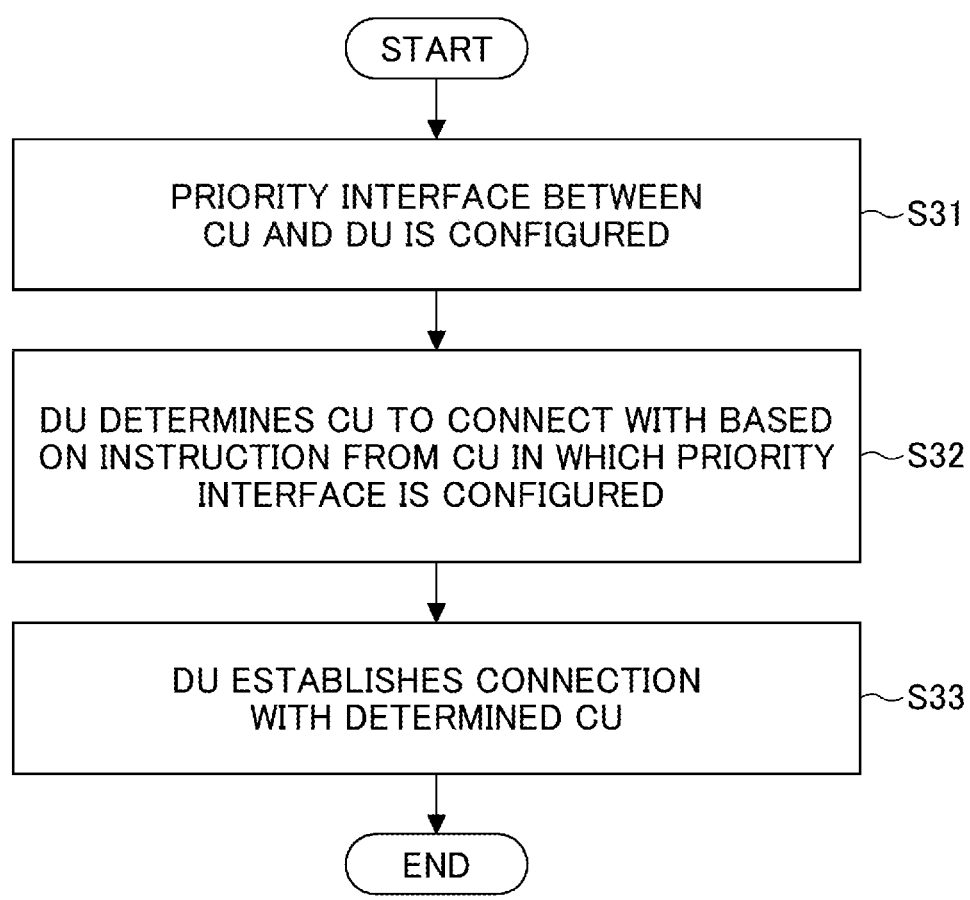
FIG. 8 is a flowchart for describing an operation example (3) in an embodiment of the present invention.

FIG. 8 is a flowchart for describing an operation example (3) in an embodiment of the present invention. An operation example in which the DU 10 that has received the RRC message from the UE 20 determines the CU 10 to which the RRC message is to be transmitted will be described with reference to FIG. 8.

In step S31, the priority interface between CU and DU is set. Then, the DU 10 determines the CU 10 to connect with based on an instruction from the CU 10 in which a priority interface is configured (S32). Then, the DU 10 establishes connection with the determined CU 10 (S33). Here, the DU 10 may newly establish connection with the CU 10 that is a connection target, or the DU 10 may transmit a UE context to the CU 10 that is a connection target and whose priority interface is configured. As described above, the DU 10 that has received the RRC message from the UE 20 can determine the CU 10 to which the RRC message is to be transmitted.

Figure 9:
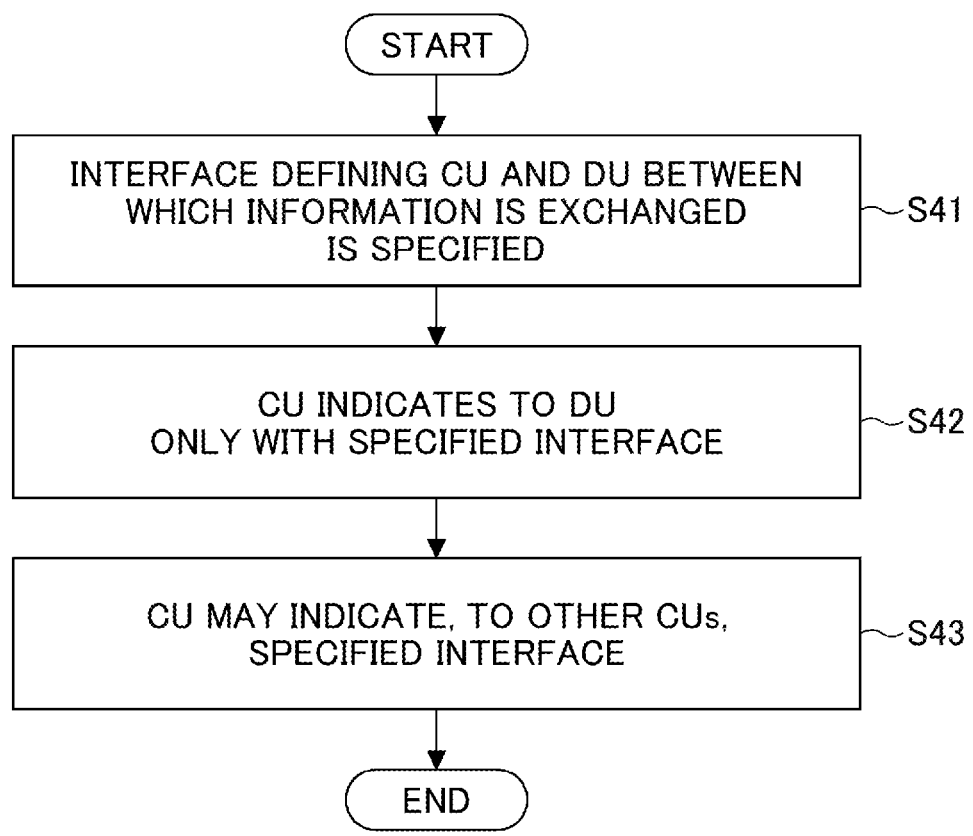
FIG. 9 is a flowchart for describing an operation example (4) in an embodiment of the present invention.

FIG. 9 is a flowchart for describing an operation example (4) in an embodiment of the present invention. An operation example in which an indication of information is given from the CU 10 to the DU 10 will be described with reference to FIG. 9.

In step S41, an interface that defines the CU and the DU between which predetermined information is exchanged is specified. The CU 10 gives an indication to the DU 10 only with a specified interface (S42). The CU 10 may indicate, to other CUs 10, the specified interface (S43). The indication in step S43 may be transmitted directly from the CU 10 to other CUs 10 or may be transmitted from the CU 10 to other CUs 10 via the DU 10. In a case in which the indication is transmitted from the CU 10 to other CUs 10 via the DU 10, the indication need not be transmitted in an interface that does not exchange the predetermined information. Also, the CU 10 may be different for each piece of predetermined information. In a case in which the predetermined information is received from a plurality of CUs 10, the DU 10 combines a plurality of pieces of predetermined information.

The predetermined information is, for example, gNB-DU system information. The gNB-DU system information is system information block (SIB) encoded by the DU 10 and corresponds to a master information block (MIB) and an SIB1. In order for the CU 10 to indicate a part of the gNB-DU system information (for example, parameters related to a prohibited cell or unified access control (UAC)), coordination is necessary between the CUs 10.

The predetermined information is, for example, gNB-CU system information. The gNB-CU system information is system information block (SIB) encoded by the CU 10 and corresponds to SIBs other than the MIB and the SIB1. In order for the CU 10 to indicate the gNB-CU system information, coordination is necessary between the CUs 10.

The predetermined information is, for example, information related to cell management that is a message (for example, gNB-DU RESOURCE COORDINATION) related to resource settings of the DU. The information related to the cell management is, for example, information indicating activation, inactivation, addition, and deletion of a cell and a cell status. In order for the CU 10 to decide whether to activate or inactivate a cell, coordination is necessary between the CUs 10 for indication. Also, it is necessary for the CU 10 to detect the cell status. In a case in which an indication of the cell management information is given from the DU 10 to the CU 10, an indication indicating addition, deletion, or status of a cell may be given in an interface that does not exchange the predetermined information.

The predetermined information is, for example, information related to delivery of emergency information (for example, WRITE-REPLACE WARNING). Since the information related to the delivery of the emergency information is a parameter that can be updated by the CU 10, coordination is necessary between the CU 10. For example, coordination is necessary in determining which CU 10 manages the information related to the delivery of the emergency information or which CU 10 is responsible for any given cell in a case where emergency information is to be delivered on a per-cell basis.

Figure 10:
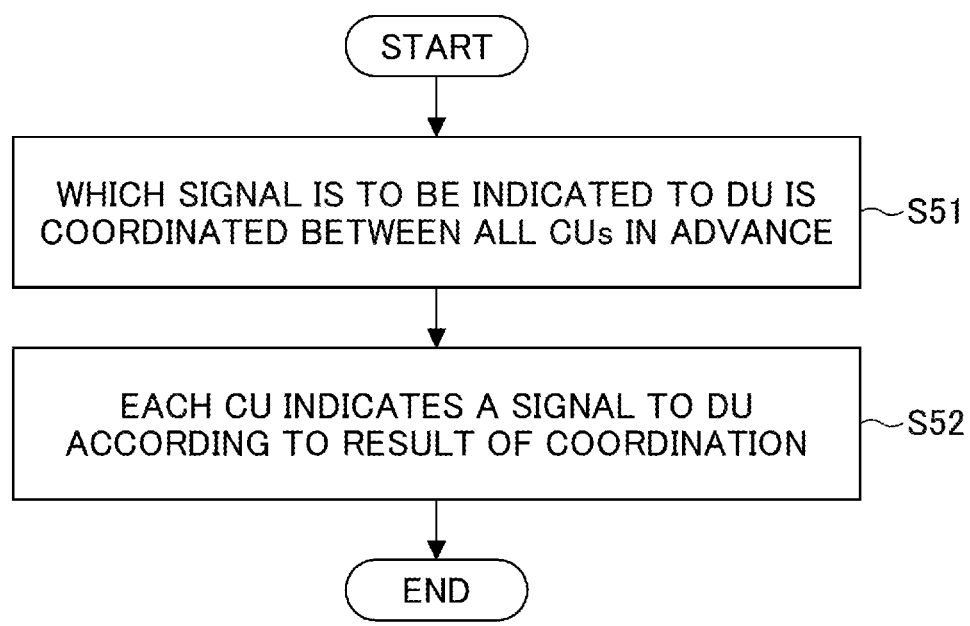
FIG. 10 is a flowchart for describing an operation example (5) in an embodiment of the present invention.

FIG. 10 is a flowchart for describing an operation example (5) in an embodiment of the present invention. An operation example in which an indication of information is given from the CU 10 to the DU 10 will be described with reference to FIG. 10.

In step S51, which signal including predetermined information is to be indicated to the DU 10 is coordinated between all the CUs 10 in advance. That is, information indicating which signal is transmitted from which CU 10 to the DU 10 is shared by communication between the CU 10. Then, each CU 10 indicates, to the DU 10, a signal according to the result of coordination (S52). The predetermined information is similar to the predetermined information described with reference to FIG. 9. Because the predetermined information that is previously coordinated between the CUs 10 is indicated, there is no inconsistency between respective indications. Therefore, a single CU 10 may indicate, to the DU 10, the predetermined information, or a plurality of CUs 10 may indicate, to the DU 10, the predetermined information.

FIG. 11 is a diagram for describing an example (1) of initialization in an embodiment of the present invention. In the related art, since a plurality HLS interfaces are not assumed, only initialization for a specific UE (for example, Part of F1 Interface) or initialization for all UEs (for example, Reset All) is assumed for initialization of the UE-specific information (UE context). However, in a case in which a plurality of HLS interfaces are configured, it is necessary to cause a range initialized on the CU 10 side to match a range initialized on the DU 10 side. In a case in which the DU 10 gives an initialization instruction to the CU 10, there is no problem in initializing the UE context of the CU 10, but in a case in which the CU 10 gives an initialization instruction to the DU 10, it is necessary to attain mutual recognition as to whether or not UE context associated with other CUs 10 within the DU 10 is to be initialized.

Therefore, the initialization may be performed only for a part associated with a corresponding HLS interface. As illustrated in FIG. 11, if the CU 10B transmits a Reset signal to the DU 10A, the DU 10A initializes the UE context associated with the interface between the CU 10B and the DU 10A as an initialization range. That is, the UE context associated with the interface between the CU 10C and the DU 10A is not included in the initialization range and not initialized.

FIG. 12 is a diagram for describing an example (2) of initialization in an embodiment of the present invention. The range initialized on the CU 10 side and the range initialized on the DU 10 may be matched by setting all the UE contexts as the initialization range and giving an indication indicating initialization to the CU 10 other than the CU 10 that has transmitted the initialization instruction and giving an indication of requesting initialization similar to initialization in the DU 10A.

As illustrated in FIG. 12, if the CU 10B transmits the Reset signal to the DU 10A, the DU 10A initializes all the UE contexts as the initialization range. Then, if the DU 10A transmits the Reset signal to the CU 10C, the DU 10C initializes the UE context.

Further, which of the initialization method illustrated in FIG. 11 and the initialization method illustrated in FIG. 12 is to be used may be indicated explicitly by the Reset signal transmitted from the CU 10B to the DU 10A illustrated in FIG. 11.

Figure 13A:
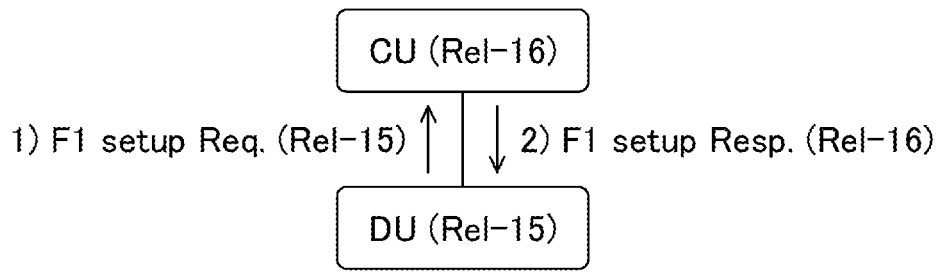
FIG. 13A is a diagram for describing an example (1) of a version indication operation.

FIG. 13A is a diagram for describing an example (1) of a version indication operation. In the related art, there is a parameter (for example, MeasGapConfig) which is obtained by encoding a part of an RRC container by the DU and is decoded and encoded again by the CU in order to be included in the higher RRC container again. Therefore, since it is necessary for the CU to have an ability of decoding the RRC container of the DU, it is necessary to cause the highest RRC versions used between the CU and the DU to be the same. In this regard, the DU indicates the latest RRC version supported by the CU, and similarly, the CU indicates the latest RRC version supported by the DU, and the highest RRC version supported by the CU and DU is used by the CU-DU interface.

As illustrated in FIG. 13A, when the RRC version of the CU is Rel-16 and the RRC version of the DU is Rel-15, the DU transmits "F1 setup Req. (Rel-15)" (F1 setup request) to the CU. Then, the CU transmits "F1 setup Resp. (Rel-16)" (F1 setup response) to the DU. Since the highest RRC version supported by both is Rel-15, Rel-15 is used in the CU-DU interface.

Figure 13B:
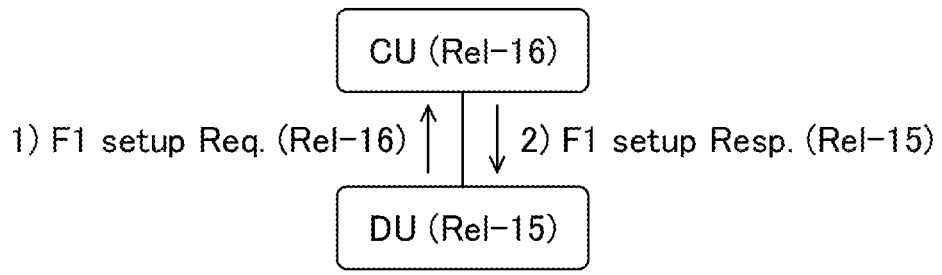
FIG. 13B is a diagram for describing an example (2) of a version indication operation.

FIG. 13B is a diagram for describing an example (2) of a version indication operation. As illustrated in FIG. 13B, when the RRC version of the CU is Rel-15 and the RRC version of the DU is Rel-16, the DU transmits "F1 setup Req. (Rel-16)" to the CU. Then, the CU transmits "F1 setup Resp. (Rel-15)" to the DU. Since the highest RRC version supported by both is Rel-15, Rel-15 is used in the CU-DU interface.

Figure 13C:
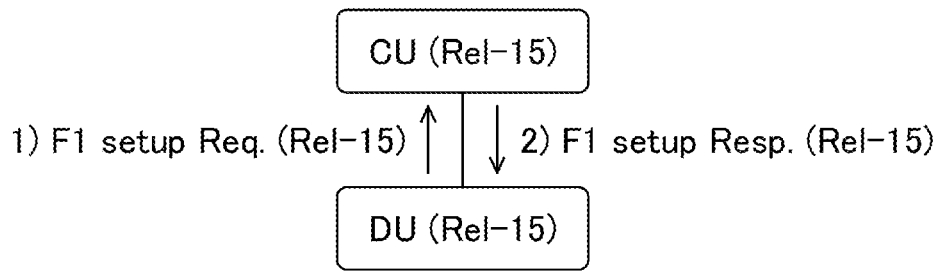
FIG. 13C is a diagram for describing an example (3) of a version indication operation.

FIG. 13C is a diagram for describing an example (3) of a version indication operation. As illustrated in FIG. 13C, when the RRC version of the CU is Rel-15 and the RRC version of the DU is Rel-15, the DU transmits "F1 setup Req. (Rel-15)" to the CU. Then, the CU transmits "F1 setup Resp. (Rel-15)" to the DU. Since the highest RRC version supported by both is Rel-15, Rel-15 is used in the CU-DU interface.

Figure 14:
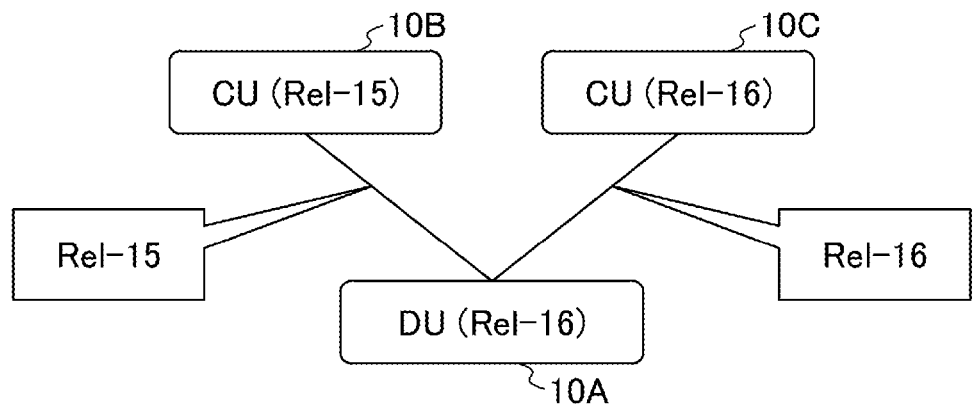
FIG. 14 is a diagram for describing an example (1) of a version indication operation in an embodiment of the present invention.

FIG. 14 is a diagram for describing an example (1) of a version indication operation in an embodiment of the present invention. In a case in which a plurality of CUs are connected to the DU, if the supported RRC version differs between the CUs, the DU is unable to determine an RRC version to be used. Therefore, in a case in which a plurality of CUs 10 are connected to the DU 10, the DU 10 uses a plurality of RRC versions for each CU 10. For the cell-common signal such as the system information, the RRC version may be switched for each CU, or the RRC version determined by the DU 10 may be used.

As illustrated in FIG. 14, in a case in which the RRC version of the CU 10B is Rel-15, the RRC version of the CU 10C is Rel-16, and the RRC version of the DU 10A is Rel-16, Rel-15 may be used in the interface between the CU 10B and the DU 10A, and Rel-16 may be used in the interface between the CU 10C and the DU 10A.

Figure 15:
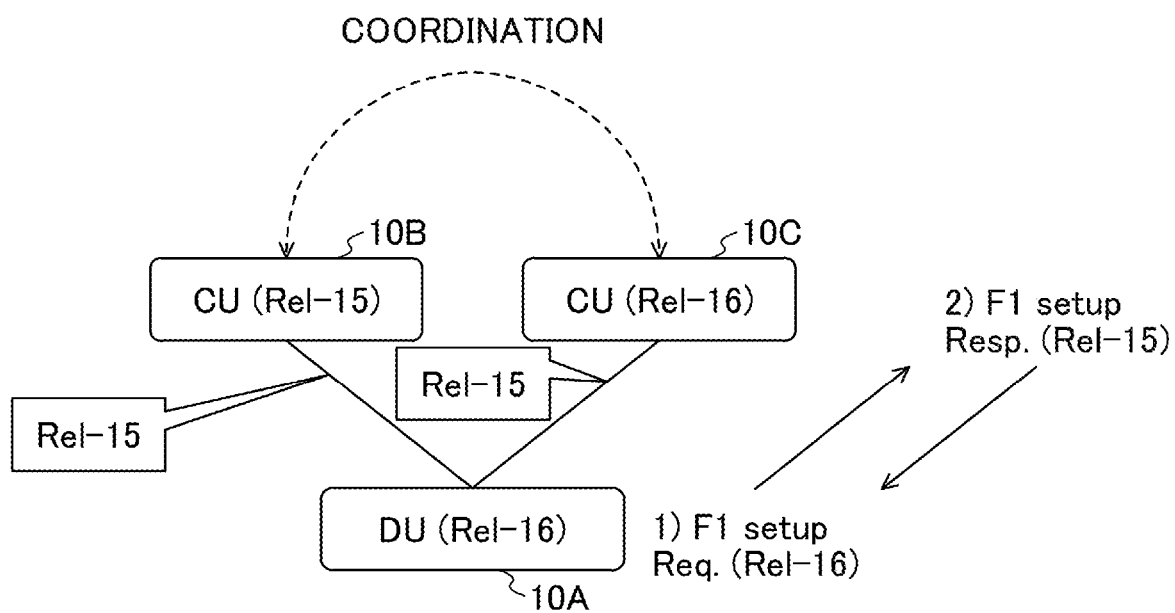
FIG. 15 is a diagram for describing an example (2) of a version indication operation in an embodiment of the present invention.

FIG. 15 is a diagram for describing an example (2) of a version indication operation in an embodiment of the present invention. As illustrated in FIG. 15, in a case in which the RRC version of the CU 10B is Rel-15, the RRC version of the CU 10C is Rel-16, and the RRC version of the DU 10A is Rel-16, each CU 10 can determine that the lowest version common between the CUs, that is, the lowest version between the CUs is Rel-15 through coordination of the CU 10B and the CU 10C, and thus in a case in which "F1 setup Req.(Rel-16)" is transmitted from the DU 10A to the CU 10C, the CU 10C may transmit "F1 setup Resp. (Rel-15)" to the DU 10A, and Rel-15 which is the same RRC version as the interface between the CU 10B and the DU 10A may be used in the interface between the CU 10C and the DU 10A interface.

Figure 16:
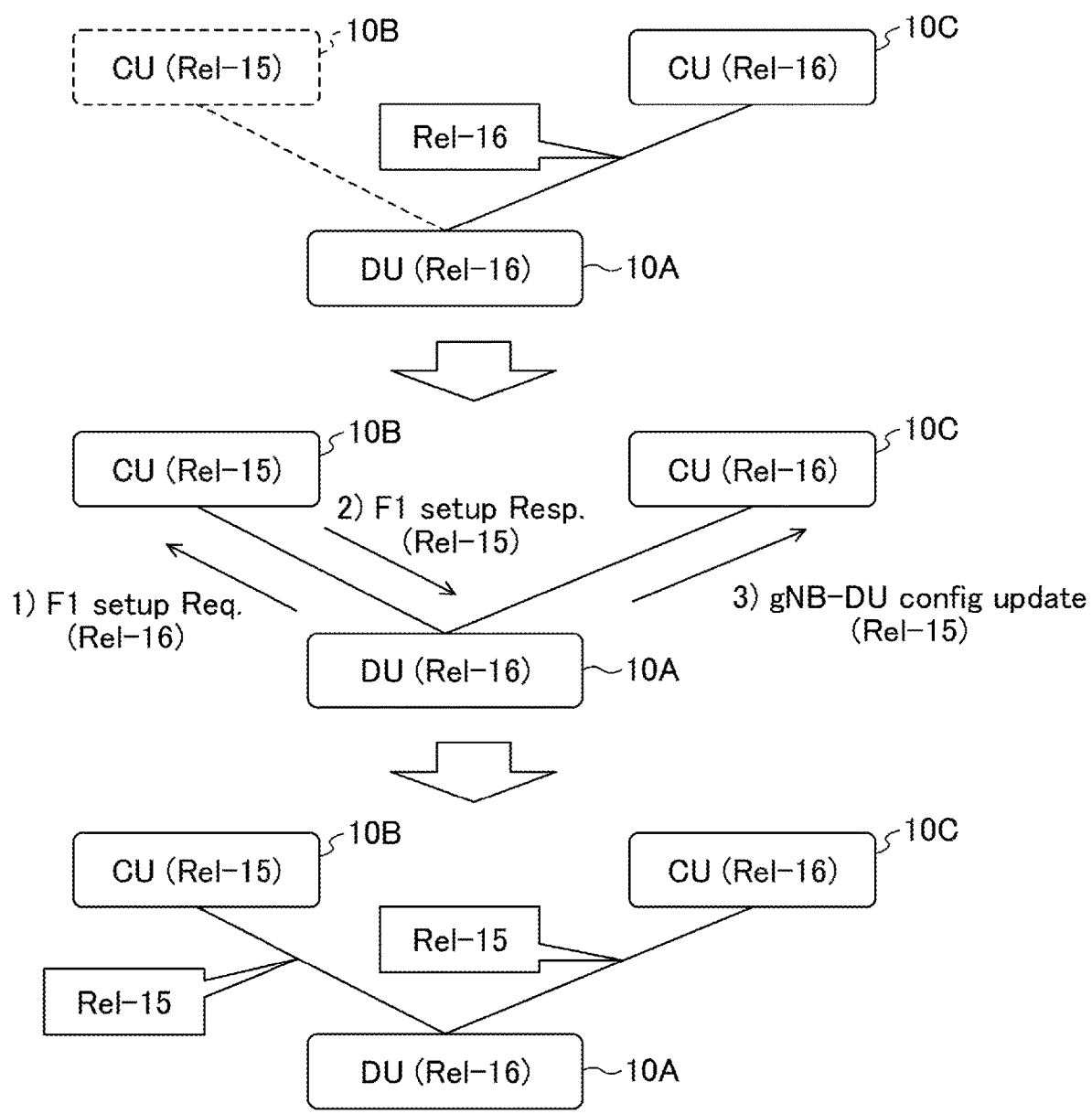
FIG. 16 is a diagram for describing an example (3) of a version indication operation in an embodiment of the present invention.

FIG. 16 is a diagram for describing an example (3) of a version indication operation in an embodiment of the present invention. The RRC version used in the CU-DU interface may be coordinated between the CUs via the DU 10. For example, the DU 10 may cause the RRC versions to match between the CUs by giving a new indication indicating an RRC version of a certain CU 10 to other CUs 10 in which the HLS interface is already established.

As illustrated in FIG. 16, the interface of the CU 10C and the DU 10A is established with the RRC version of Rel-16. In this state, the DU 10A transmits "F1 setup Req. (Rel-16)" to the CU 10B. Then, the CU 10B transmits "F1 setup Resp. (Rel-15)" to the DU 10A. Then, since the RRC version of the interface of the CU 10B is lower than the RRC version of the interface of the CU 10C, the DU 10A transmits "gNB-DU config update (Rel-15)" to the CU 10C, and changes the RRC version of the interface between the CU 10C and the CU 10A to Rel-15. The F1 message name "gNB-DU config update" is an example, and other names may be used.

Figure 17:
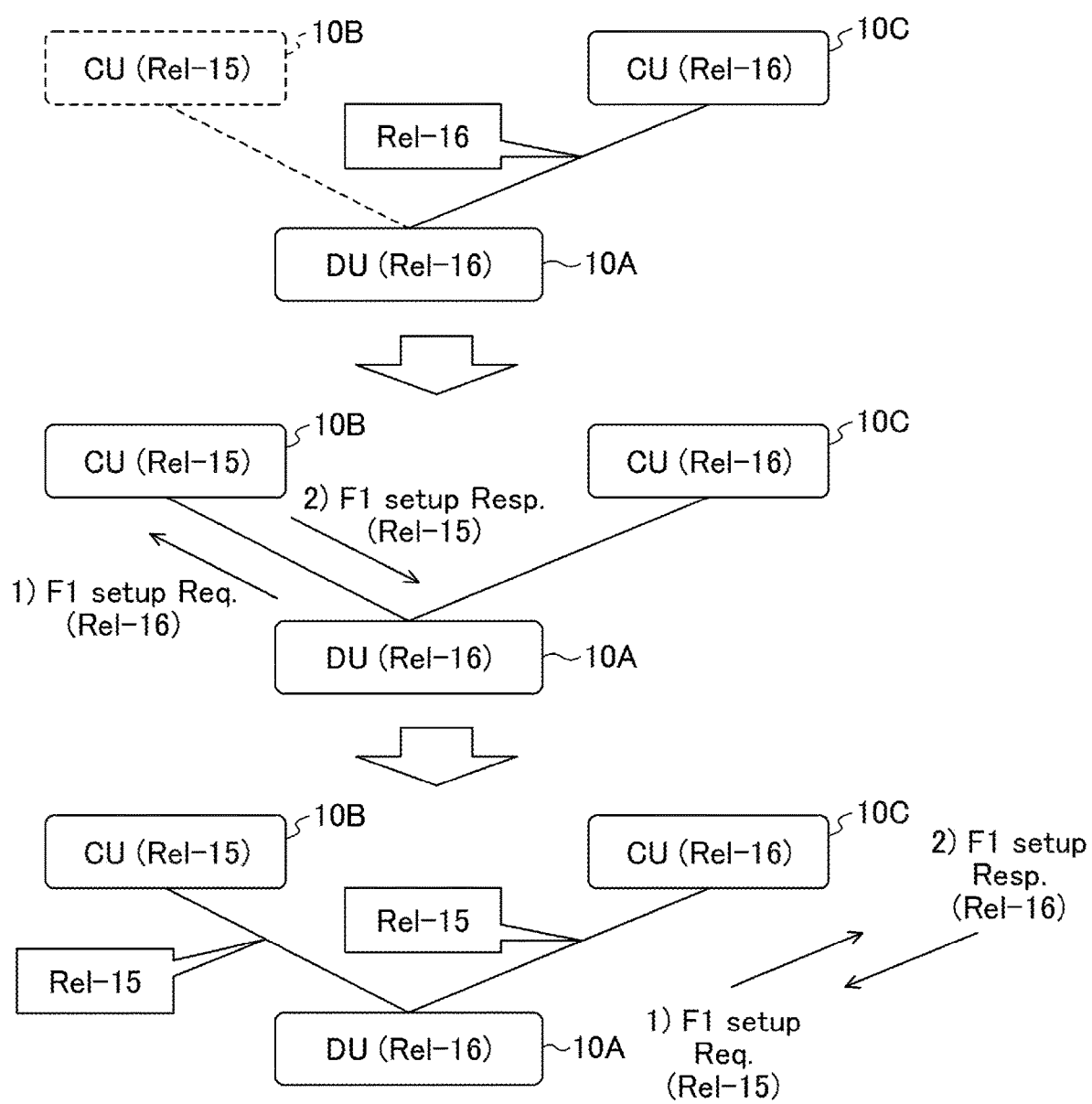
FIG. 17 is a diagram for describing an example (4) of a version indication operation in an embodiment of the present invention.

FIG. 17 is a diagram for describing an example (4) of a version indication operation in an embodiment of the present invention. The DU 10 may disconnect the already established F1 interface and re-establish the F1 interface with the RRC version used by other CUs 10.

As illustrated in FIG. 17, the interface between the CU 10C and the DU 10A is established with the RRC version of Rel-16. In this state, the DU 10A transmits "F1 setup Req. (Rel-16)" to the CU 10B. Then, the CU 10B transmits "F1 setup Resp. (Rel-15)" to the DU 10A. Then, since the RRC version of the interface of the CU 10B is lower than the RRC version of the interface of the CU 10C, the DU 10A transmits "F1 setup Req. (Rel-15)" to the CU 10C. Then, the CU 10C transmits "F1 setup Resp. (Rel-15)" to the DU 10A, and changes the RRC version of the interface between the CU 10C and the CU 10A to Rel-15.

According to the above embodiment, in the configuration in which a plurality of CUs are connected to the DU, the CU or the DU that is the network node can appropriately determine the RRC version used between the CU and the DU.

In other words, it is possible to transmit and receive information that is matched between network nodes in a wireless communication system.

Device Configuration

Next, function configuration examples of a base station device 10 and a user equipment 20 that execute the processes and the operations described above will be described. The base station device 10 and the user equipment 20 have functions for implementing the embodiments described above. However, each of the base station device 10 and the user equipment 20 may have only some of the functions in the embodiment.

Base Station Device 10

Figure 18:
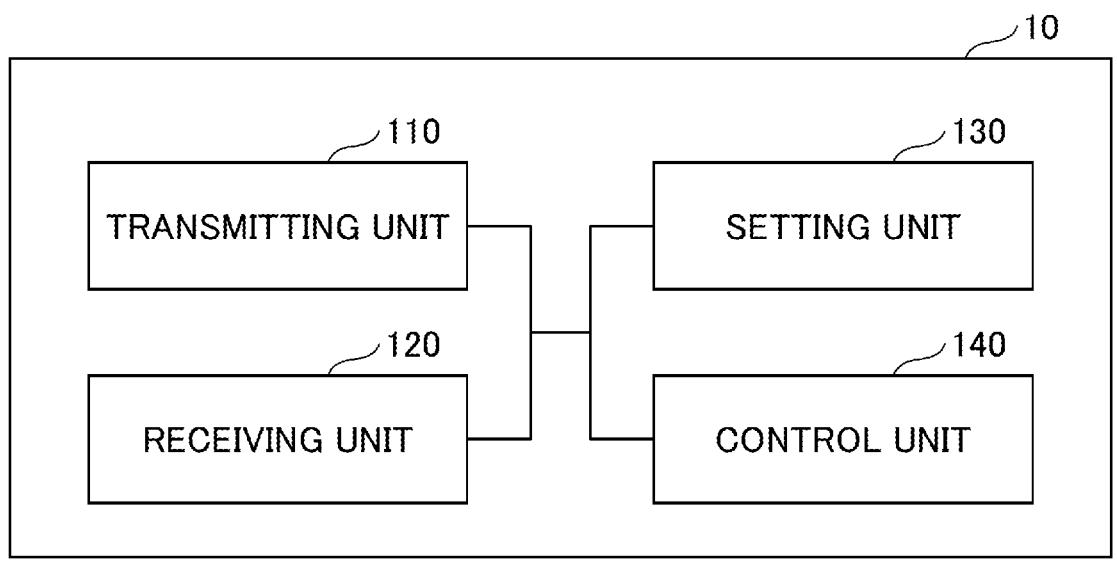
FIG. 18 is a diagram illustrating an example of a functional configuration of a base station device 10 in an embodiment of the present invention.

FIG. 18 is a diagram illustrating an example of a functional configuration of the base station device 10 in an embodiment of the present invention. As illustrated in FIG. 18, the base station device 10 includes a transmitting unit 110, a receiving unit 120, a setting unit 130, and a control unit 140. The functional configuration illustrated in FIG. 18 is only an example. A functional classification and names of the functional unit may be any classification and any names as long as the operation according to an embodiment of the present invention can be executed. Further, the base station device 10 may be the split CU 10 or DU 10.

The transmitting unit 110 includes a function of generating a signal to be transmitted to the user equipment 20 side and transmitting the signal wirelessly. Further, the transmitting unit 110 transmits an inter-network node message to other network nodes. The receiving unit 120 includes a function of receiving various kinds of signals transmitted from the user equipment 20 and acquiring, for example, higher layer information from the received signals. Further, the transmitting unit 110 includes a function of transmitting NR-PSS, NR-SSS, NR-PBCH, and DL/UL control signals or the like to the user equipment 20. Also, the receiving unit 120 receives the inter-network node message from other network nodes.

The setting unit 130 stores configuration information configured in advance and various kinds of configuration information to be transmitted to the user equipment 20 in a storage device, and reads out them from the storage device if necessary. For example, content of the configuration information is configuration information related to the RRC message, configuration information related to the communication of the user equipment 20, or the like.

As described in the embodiment, the control unit 140 controls wireless communication for transmitting and receiving the RRC messages. Further, the control unit 140 controls initialization related to configurations related to communication of the user equipment 20. The functional unit related to signal transmission in the control unit 140 may be included in the transmitting unit 110, and the functional unit related to signal reception in the control unit 140 may be included in the receiving unit 120.

User Equipment 20

Figure 19:
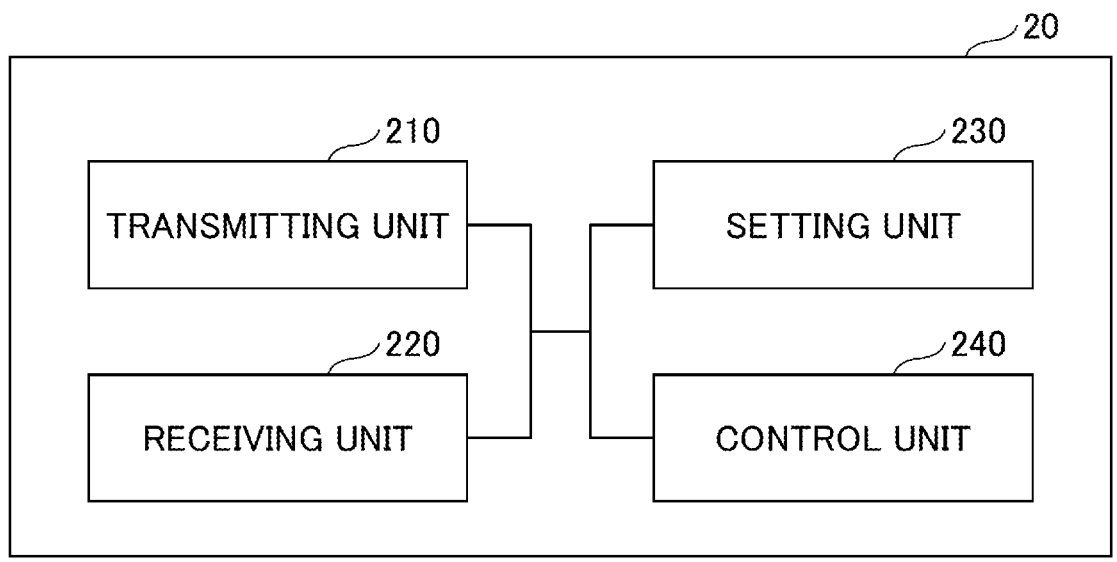
FIG. 19 is a diagram illustrating an example of a functional configuration of a user equipment 20 in an embodiment of the present invention.

FIG. 19 is a diagram illustrating an example of a functional configuration of the user equipment 20 in an embodiment of the present invention. As illustrated in FIG. 19, the user equipment 20 includes a transmitting unit 210, a receiving unit 220, a setting unit 230, and a control unit 240. The functional configuration illustrated in FIG. 19 is only an example. A functional classification and names of the functional unit may be any classification and any names as long as the operation according to an embodiment of the present invention can be executed.

The transmitting unit 210 generates a transmission signal from transmission data and transmits the transmission signal wirelessly. The receiving unit 220 wirelessly receives various kinds of signals and acquires higher layer signals from received physical layer signals. The receiving unit 220 includes a function of receiving NR-PSS, NR-SSS, NR-PBCH, and DL/UL/SL control signals or the like transmitted from the base station device 10. Further, for example, the transmitting unit 210 transmits a physical sidelink control channel (PSCCH), a physical sidelink shared channel (PSSCH), a physical sidelink discovery channel (PSDCH), a physical sidelink broadcast channel (PSBCH), and the like to other user equipment 20 as D2D communication, and the receiving unit 120 receives PSCCH, PSSCH, PSDCH, PSBCH, and the like from other user equipment 20.

The setting unit 230 stores various kinds of configuration information received from the base station device 10 or the user equipment 20 through the receiving unit 220 in the storage device, and reads out them from the storage device if necessary. The setting unit 230 also stores configuration information configured in advance. For example, content of the configuration information is configuration information related to the RRC message.

As described in the embodiment, the control unit 240 controls wireless communication for transmitting and receiving the RRC messages. The control unit 240 receives information related to wireless communication from the base station device 10, controls the wireless communication of the user equipment 20 based on the information, and reports necessary information to the base station device 10. The functional unit related to signal transmission in the control unit 240 may be included in the transmitting unit 210, and the functional unit related to signal reception in the control unit 240 may be included in the receiving unit 220.

Hardware Configuration

In the block diagrams (FIGS. 18 and 19) used for the description of the embodiment, the blocks of the functional units are illustrated. The functional blocks (configuring units) are implemented by an arbitrary combination of hardware and/or software. A device of implementing each functional block is not particularly limited. In other words, each functional block may be implemented by one device which is physically or logically combined or may be implemented by a plurality of devices, that is, two or more devices which are physically and/or logically separated and are directly or indirectly connected (for example, a wired and/or wireless manner). The function block may be implemented by combining software with the one device or the plurality of devices.

The functions include determining, deciding, judging, computing, calculating, processing, deriving, investigating, searching, confirming, receiving, transmitting, outputting, accessing, resolving, selecting, choosing, establishing, comparing, assuming, expectation, regarding, broadcasting, notifying, communicating, forwarding, configuring, reconfiguring, allocating, mapping, assigning, and the like but are not limited thereto. For example, a functional block (configuring unit) that causes transmission to function is referred to as a transmitting unit or a transmitter. In any case, as described above, an implementation method is not particularly limited.

Figure 20:
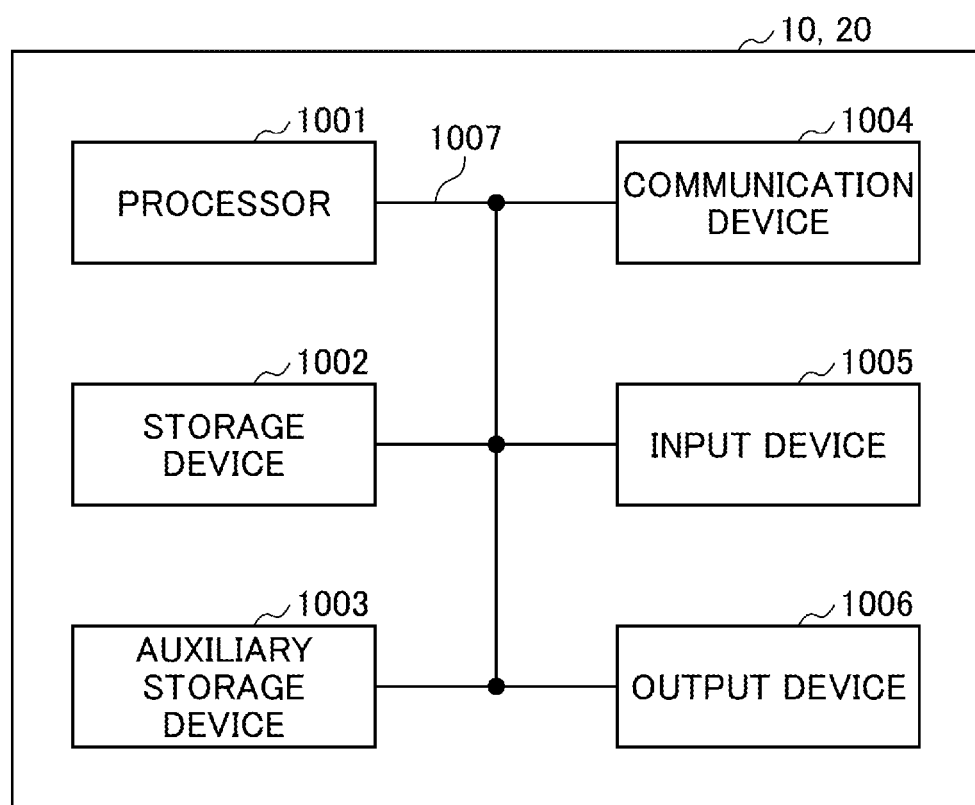
FIG. 20 is a diagram illustrating an example of a hardware configuration of the base station device 10 or the user equipment 20 in an embodiment of the present invention.

For example, the base station device 10, the user equipment 20, or the like in one embodiment of the present disclosure may function as a computer for processing the present disclosure's wireless communication method. FIG. 20 is a diagram illustrating an example of a hardware configuration of the base station device 10 and the user equipment 20 according to an embodiment of the present disclosure. Each of the base station device 10 and the user equipment 20 may be physically configured as a computer device including a processor 1001, a storage device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station device 10 and the user equipment 20 may be configured to include one or more devices illustrated in the drawing or may be configured without including some devices.

Each function in each of the base station device 10 and the user equipment 20 is implemented such that predetermined software (program) is read on hardware such as the processor 1001 and the storage device 1002, and the processor 1001 performs an operation and controls communication by the communication device 1004 and reading and/or writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the control unit 140, the control unit 240, and the like described above may be implemented by the processor 1001.

Further, the processor 1001 reads a program (program code), a software module, or data from at least one of the auxiliary storage device 1003 and/or the communication device 1004 out to the storage device 1002, and executes various types of processes according to them. A program causing a computer to execute at least some of the operations described in the above embodiment is used as the program. For example, the control unit 140 of the base station device 10 illustrated in FIG. 18 may be implemented by a control program which is stored in the storage device 1002 and operates on the processor 1001. Further, for example, the control unit 240 of the user equipment 20 illustrated in FIG. 19 may be implemented by a control program which is stored in the storage device 1002 and operates on the processor 1001. Various types of processes have been described as being performed by one processor 1001 but may be performed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage medium may be, for example, a database, a server, or any other appropriate medium including at least one of the storage device 1002 and the auxiliary storage device 1003.

The communication device 1004 is hardware (a transceiving device) for performing communication between computers via at least one of a wired network and a wireless network and is also referred to as a "network device," a "network controller," a "network card," a "communication module," or the like. The communication device 1004 may include a high-frequency switch, a duplexer, a filter, a frequency synthesizer, or the like in order to implement at least one of frequency division duplex (FDD) and time division duplex (TDD). For example, a transceiving antenna, an amplifying unit, a transmitting/receiving unit, a transmission line interface, or the like may be implemented by the communication device 1004. The transmitting/receiving unit may be implemented by to be physically or logically separated by a transmitting unit and a receiving unit.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. The input device 1005 and the output device 1006 may be integrated (for example, a touch panel).

The respective devices such as the processor 1001 and the storage device 1002 are connected via the bus 1007 to communicate information with each other. The bus 1007 may be configured with a single bus or may be configured with different buses between the devices.

Further, each of the base station device 10 and the user equipment 20 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented using at least one of these pieces of hardware.

Conclusion of Embodiment

As described above, according to an embodiment of the present invention, a network node including a receiving unit that receives information related to a protocol version of a message of a higher layer and a control unit that uses a same protocol version for a plurality of higher network nodes that terminate and split the higher layer, based on the information related to the protocol version, in which the network node is one of the plurality of higher network nodes is provided.

With the above configuration, in the configuration in which a plurality of CUs are connected to the DU, the CU or the DU that is the network node can appropriately determine the RRC version used between the CU and the DU. In other words, it is possible to use a protocol version that is matched across network nodes in a wireless communication system.

A transmitting unit that transmits the information related to the protocol version to one of the plurality of higher network nodes may be further provided. With this configuration, in the configuration in which a plurality of CUs are connected to the DU, the CU that is the network node can cooperatively determine the RRC version to be used between the CU and the DU.

The same protocol version for the plurality of higher network nodes may be a lowest version of the plurality of higher network nodes. With this configuration, the lowest RRC version can be adopted as the RRC version to be used across a plurality of CUs.

When the control unit receives an interface establishment request including a protocol version of a message of a higher layer from a lower network node, the control unit may transmit an interface establishment response including the lowest protocol version of the plurality of higher network nodes to the lower network node. With this configuration, in a case in which the interface establishment request is received from the DU, the CU can notify the DU of the RRC version emphasized with other CUs by an interface establishment response.

According to an embodiment of the present invention, a network node including a transmitting unit that transmits an interface establishment request including a protocol version of a message of a higher layer to one of a plurality of higher network nodes that terminate and split the higher layer, a receiving unit that receives an interface establishment response including the protocol version of the message of the higher layer from the higher network node to which the interface establishment request has been transmitted, and a control unit that transmits the protocol version of the message of the higher layer included in the interface establishment response to a higher network node other than the higher network node to which the interface establishment request has been transmitted is provided.

With the above configuration, in the configuration in which a plurality of CUs are connected to the DU, the CU or the DU that is the network node can appropriately determine the RRC version used between the CU and the DU. In other words, it is possible to use a protocol version that is matched across network nodes in a wireless communication system.

When the protocol version of the message of the higher layer included in the interface establishment response is lower than a protocol version of an already established interface, the control unit may transmit the protocol version of the message of the higher layer included in the interface establishment response to a higher network node corresponding to the already established interface. With this configuration, upon receiving the interface establishment response including the version lower than the protocol version of the already established interface from the CU, the DU can transmit the lower version to other CUs, that is, the CU corresponding to the already established interface, and thus, the same RRC version can be used across the CUs.

When the protocol version of the message of the higher layer included in the interface establishment response is lower than the protocol version of the already established interface, the control unit may transmit the protocol version of the message of the higher layer included in the interface establishment response to a higher network node corresponding to the already established interface: by maintaining the interface and including the protocol version of the message of the higher layer in a configuration change request; or by disconnecting the interface and re-including the protocol version of the message of the higher layer in an interface establishment request. With this configuration, upon receiving the interface establishment response including the version lower than the protocol version of the already established interface from the CU, the DU can transmit the lower version to other CUs, that is, the CU corresponding to the already established interface, and thus, the same RRC version can be used across the CUs.

Supplement of Embodiment

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention, matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station device 10 and the user equipment 20 have been described using the functional block diagrams, but such devices may be implemented by hardware, software, or a combination thereof. Software executed by the processor included in the base station device 10 according to the embodiment of the present invention and software executed by the processor included in the user equipment 20 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Further, an indication of information is not limited to the aspect or embodiment described in the present disclosure and may be given by any other method. For example, the indication of information may be given by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB))), other signals, or a combination thereof. Further, the RRC signaling may be referred to as an RRC message and may be, for example, an RRC connection setup message, an RRC connection reconfiguration message, or the like.

Each aspect and embodiment of the present invention may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), New Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and next generation systems extended based on these standards. Further, a plurality of systems may be combined and applied (for example, a combination of at least one of LTE and LTE-A and 5G or the like).

The processing procedures, the sequences, the flowcharts, and the like of the respective aspects/embodiments described in this specification may be reversed in order unless there is a contradiction. For example, the method described in the present disclosure presents elements of various steps using an exemplary order and is not limited to a presented specific order.

In this specification, a specific action that is supposed to be performed by the base station device 10 may be performed by an upper node in some cases. In the network including one or more network nodes including the base station device 10, various operations performed for communication with the user equipment 20 can be obviously performed by at least one of the base station and any network node (for example, an MME, an S-GW, or the like is considered, but it is not limited thereto) other than the base station device 10 and/or the base station device 10. The example in which the number of network nodes excluding the base station device 10 is one has been described above, but other network nodes in which a plurality of other network nodes (for example, an MME and an S-GW) are combined may be provided.

Information, a signal, or the like described in the present disclosure may be output from an upper layer (or a lower layer) to a lower layer (or an upper layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using at least one of a wired technology (such as a coaxial cable, a fiber optic cable, a twisted pair, or a digital subscriber line (DSL)) and a radio technology (such as infrared rays or a microwave), at least one of the wired technology and the radio technology are included in a definition of a transmission medium.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC) may be referred to as a "carrier frequency," a "cell," or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names allocated to the various channels and the information elements are not limited in any respect.

In the present disclosure, the terms "base station (BS)," "radio base station," "base station device," "fixed station," "Node B," "eNode B (eNB) gNodeB (gNB)," "access point," "transmission point," "reception point," "transmission/reception point," "cell," "sector," "cell group," "carrier," "component carrier," and the like can be used interchangeably. The base stations may also be indicated by terms such as a macro cell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, It may also be referred to as a remote terminal, handset, user agent, mobile client, client, or some other suitable term.

At least one of the base station and the mobile station may be also referred to as a transmitting device, a receiving device, a communication device, or the like. At least one of the base station and the mobile station may be a device installed in a mobile body, a mobile body itself, or the like. The moving body may be a vehicle (for example, a car, an airplane, or the like), a moving body that moves unmanned (for example, a drone, an autonomous car or the like), or a robot (manned type or unmanned type). At least one of the base station and the mobile station includes a device which need not necessarily move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of user equipment 20 (for example, which may be referred to as device-to-device (D2D) or vehicle-to-everything (V2X)). In this case, the user equipment 20 may have the functions of the base station device 10 described above. Further, the terms "uplink" and "downlink" may be replaced with terms (for example, "side") corresponding to inter-terminal communication. For example, an uplink channel, a downlink channel, or the like may be read with side channels.

Similarly, the user terminal in the present disclosure may be replaced with the base station. In this case, the base station may have the functions of the above-mentioned user terminal.

The terms "determining" and "deciding" used in this specification may include a wide variety of actions. For example, "determining" and "deciding" may include, for example, events in which events such as judging, calculating, computing, processing, deriving, investigating, looking up, search, and inquiry (for example, looking up in a table, a database, or another data structure), or ascertaining are regarded as "determining" or "deciding." Further, "determining" and "deciding" may include, for example, events in which events such as receiving (for example, receiving information), transmitting (for example, transmitting information), input, output, or accessing (for example, accessing data in a memory) are regarded as "determining" or "deciding." Further, "determining" and "deciding" may include, for example, events in which events such as resolving, selecting, choosing, establishing, or comparing are regarded as "determining" or "deciding." In other words, "determining" and "deciding" may include events in which a certain operation is regarded as "determining" or "deciding." Further, "determining (deciding)" may be replaced with "assuming," "expecting," "considering," or the like.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or an light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based on only" unless otherwise stated. In other words, a phrase "based on" means both "based on only" and "based on at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Further, "means" in the configuration of each of the above devices may be replaced with "unit," "circuit," "device," or the like.

In a case in which "include," "including," and variations thereof are used in the present disclosure, these terms are intended to be comprehensive, similarly to a term "comprising." Further, the term "or" used in the present disclosure is intended not to be an exclusive disjunction.

A radio frame may include one or more frames in the time domain. In the time domain, each of one or more frames may be referred to as a sub frame. The sub frame may further include one or more slots in the time domain. The sub frame may have a fixed time length (for example, 1 ms) not depending on numerology.

The numerology may be a communication parameter applied to at least one of transmission and reception of a certain signal or channel. For example, the numerology may indicate at least one of a sub carrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a sub frame, a slot, a mini slot, and a symbol indicates a time unit for transmitting a signal. As a radio frame, a sub frame, a slot, a mini slot, and a symbol, different designations respectively corresponding to them may be used.

For example, one sub frame may be referred to as a transmission time interval (TTI: Transmission Time Interval), or a plurality of consecutive sub frames may be referred to as TTIs, or one slot or one mini slot may be referred to as a TTI. In other words, at least one of the sub frame and the TTI may be a sub frame (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the sub frame.

Here, for example, the TTI refers to a minimum time unit of scheduling in wireless communication. For example, in the LTE system, the base station performs scheduling of allocating a radio resource (a frequency bandwidth, a transmission power, or the like which can be used in each user equipment 20) to each user equipment 20 in units of TTIs. The definition of the TTI is not limited thereto.

The TTI may be a transmission time unit such as a channel coded data packet (transport block), a code block, or a code word, or may be a processing unit such as scheduling or link adaptation. Further, when a TTI is given, a time interval (for example, the number of symbols) in which a transport block, a code block, a code word, or the like is actually mapped may be shorter than the TTI.

Further, when one slot or one mini slot is referred to as a TTI, one or more TTIs (that is, one or more slots or one or more mini slots) may be a minimum time unit of scheduling. Further, the number of slots (the number of mini slots) constituting the minimum time unit of scheduling may be controlled.

A TTI having a time length of 1 ms may be referred to as a common TTI (TTI in LTE Rel. 8 to 12), a normal TTI, a long TTI, a common sub frame, a normal sub frame, a long sub frame, a slot, or the like. A TTI shorter than the common TTI may be referred to as a reduced TTI, a short TTI, a partial TTI (a partial or fractional TTI), a reduced sub frame, a short sub frame, a mini slot, a sub slot, a slot, or the like.

Further, a long TTI (for example, a common TTI, a sub frame, or the like) may be replaced with a TTI having a time length exceeding 1 ms, and a short TTI (for example, a reduced TTI or the like) may be replaced with a TTI having a TTI length which is less than a TTI length of a long TTI and equal to or more than 1 ms.

The resource block (RB) is a resource allocation unit in the time domain and the frequency domain and may include one or more consecutive subcarriers in the frequency domain. The number of sub carriers included in an RB may be the same irrespective of a numerology and may be, for example, 12. The number of sub carriers included in an RB may be decided based on a numerology.

Further, a time domain of an RB may include one or more symbols and may be a length of one slot, one mini slot, one sub frame, or one TTI. Each of one TTI, one sub frame, or the like may be constituted by one or more resource blocks.

Further, one or more RBs may be referred to as a physical resource block (PRB), a sub carrier group (SCG), a resource element group (REG), a PRB pair, an RB pair, or the like.

Further, the resource block may be constituted by one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it may not be assumed that the UE transmits and receives a predetermined signal/channel outside an active BWP. Further, a "cell," a "carrier," or the like in the present disclosure may be replaced with a "BWP."

Structures of the radio frame, the sub frame, slot, the mini slot, and the symbol are merely examples. For example, configurations such as the number of sub frames included in a radio frame, the number of slots per sub frame or radio frame, the number of mini slots included in a slot, the number of symbols and RBs included in a slot or a mini slot, the number of sub carriers included in an RB, the number of symbols in a TTI, a symbol length, a cyclic prefix (CP) length, and the like can be variously changed.

In the entire present disclosure, for example, when an article such as "a," "an," or "the" in English is added by a translation, the present disclosure may include a case in which a noun following the article is the plural.

In the present disclosure, a term "A and B are different" may mean "A and B are different from each other." Further, the term may mean "each of A and B is different from C." Terms such as "separated," "coupled," or the like may also be interpreted in similarly to "different."

Each aspect/embodiment described in this specification may be used alone, in combination, or may be switched in accordance with the execution. Further, indication of predetermined information (for example, indication of "being X") is not limited to being performed explicitly, but is performed by implicit (for example, not indicating the predetermined information) It is also good.

In the present disclosure, the CU 10 is an example of a higher network node. The DU 10 is an example of a lower network node. The RRC message is an example of a message of a higher layer. The RRC version is an example of the protocol version of the higher layer message. The F1 setup Req. is an example of the interface establishment request. The F1 setup Resp. is an example of the interface establishment response.

Although the present disclosure has been described above in detail, it is obvious to those skilled in the art that the present disclosure is not limited to the embodiments described in the present disclosure. The present disclosure may be implemented as revised and modified forms without departing from the gist and scope of the present disclosure as configured forth in claims. Therefore, the description of the present disclosure is for the purpose of illustration and does not have any restrictive meaning to the present disclosure.

EXPLANATIONS OF LETTERS OR NUMERALS

10 BASE STATION DEVICE
110 TRANSMITTING UNIT
120 RECEIVING UNIT
130 SETTING UNIT
140 CONTROL UNIT
20 USER EQUIPMENT
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A network node comprising:
a transmitter that transmits, to a higher network node that terminates a higher layer, an interface establishment request including a first latest Radio Resource Control (RRC) version of a higher layer message protocol that is supported by the network node itself;
a receiver that receives, from the higher network node that is a transmission destination of the interface establishment request, an interface establishment response including a second latest RRC version of the higher layer message protocol that is supported by the higher network node; and
a processor that determines a version of the higher layer message protocol to be used, based on the interface establishment request and the interface establishment response,
wherein the version of the higher layer message protocol to be used is a latest RRC version supported by both of the network node and the higher network node of the first latest RRC version and the second latest RRC version.

2. A network node comprising:
a receiver that receives an interface establishment request, including a first latest Radio Resource Control (RRC) version of a higher layer message protocol supported by a lower network node, from the lower network node;
a transmitter that transmits, to the lower network node that is a transmission source of the interface establishment request, an interface establishment response including a second latest RRC version of the higher layer message protocol supported by the network node itself; and
a processor that determines a version of the higher layer message protocol to be used, based on the interface establishment request and the interface establishment response,
wherein the version of the higher layer message protocol to be used is a latest RRC version supported by both of the network node and the lower network node of the first latest RRC version and the second latest RRC version.

3. A system comprising:
a higher network node; and
a lower network node, wherein
the lower network node includes:
a first transmitter that transmits, to the higher network node that terminates a higher layer, an interface establishment request including a first latest Radio Resource Control (RRC) version of a higher layer message protocol supported by the lower network node itself;
a first receiver that receives, from the higher network node that is a transmission destination of the interface establishment request, an interface establishment response including a second latest RRC version supported of the higher layer message protocol by the higher network node; and
a first processor that determines a version of the higher layer message protocol to be used, based on the interface establishment request and the interface establishment response, and
the higher network node includes:
a second receiver that receives, from the lower network node, the interface establishment request including the first latest RRC version of the higher layer message protocol supported by the lower network node;
a second transmitter that transmits the interface establishment response including the second latest RRC version of the higher layer message protocol supported by the higher network node to the lower network node that is a transmission source of the interface establishment request; and
a second processor that determines the version of the higher layer message protocol to be used, based on the interface establishment request and the interface establishment response,
wherein the version of the higher layer message protocol to be used is a latest RRC version supported by both of the higher network node and the lower network node of the first latest RRC version and the second latest RRC version.

4. A communication method performed by a network node, the communication method comprising:
transmitting, to a higher network node that terminates a higher layer, an interface establishment request including a first latest Radio Resource Control (RRC) version of a higher layer message protocol supported by the network node itself;
receiving, from the higher network node that is a transmission destination of the interface establishment request, an interface establishment response including a second latest RRC version of the higher layer message protocol supported by the higher network node; and
determining a version of the higher layer message protocol to be used, based on the interface establishment request and the interface establishment response, wherein the version of the higher layer message protocol to be used is a latest RRC version supported by both of the network node and the higher network node of the first latest RRC version and the second latest RRC version.

* * * * *